United States Patent
Friedrich et al.

(10) Patent No.: US 8,638,195 B2
(45) Date of Patent: Jan. 28, 2014

(54) METHOD, TRANSPONDER, AND CIRCUIT FOR SELECTING ONE OR MORE TRANSPONDERS

(75) Inventors: Ulrich Friedrich, Ellhofen (DE); Michael Pangels, Ludwigsburg (DE)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 13/051,797

(22) Filed: Mar. 18, 2011

(65) Prior Publication Data

US 2011/0163853 A1     Jul. 7, 2011

Related U.S. Application Data

(63) Continuation of application No. 11/210,896, filed on Aug. 25, 2005, now abandoned.

(30) Foreign Application Priority Data

Aug. 27, 2004  (DE) .................. 10 2004 041 437

(51) Int. Cl.
*G06K 7/01*  (2006.01)

(52) U.S. Cl.
USPC ............................ 340/10.2; 340/10.1

(58) Field of Classification Search
USPC ............ 340/10.1, 10.2, 10.3, 10.5, 572.1, 340/10.31, 10.32, 10.33, 10.34, 10.4, 10.41, 340/10.42, 10.51, 572.2, 572.3
See application file for complete search history.

(56) References Cited

U.S. PATENT DOCUMENTS

| | | | |
|---|---|---|---|
| 4,471,345 A * | 9/1984 | Barrett, Jr. ................. | 340/572.1 |
| 5,124,699 A * | 6/1992 | Tervoert et al. ............. | 340/10.2 |
| 5,550,547 A | 8/1996 | Chan | |
| 5,875,465 A * | 2/1999 | Kilpatrick et al. ............ | 711/134 |
| 6,154,136 A | 11/2000 | Van Eeden | |
| 6,499,656 B1 * | 12/2002 | Marsh et al. ................. | 235/375 |
| 6,538,563 B1 | 3/2003 | Heng | |
| 2001/0014090 A1 | 8/2001 | Wood | |
| 2003/0179078 A1 | 9/2003 | Chen | |
| 2004/0160310 A1 | 8/2004 | Chen | |

FOREIGN PATENT DOCUMENTS

| | | |
|---|---|---|
| WO | 03/040998 A1 | 5/2003 |
| WO | 03/107256 A1 | 12/2003 |

OTHER PUBLICATIONS

Finkenzeller, Klaus RFID—Handbuch: 3rd edition, Carl Hanser Verlag Munchen, Wien, pp. 203-224, 2002.

* cited by examiner

*Primary Examiner* — Nabil Syed
(74) *Attorney, Agent, or Firm* — Baker Botts LLP

(57) ABSTRACT

A method and device for selecting one or more transponders, in particular backscatter-based transponders, from a plurality of transponders by a base station, which method is based on a slotted ALOHA method, in which the base station defines numbered time slots and a random number generated in a given transponder determines a time slot when the transponder transmits its transponder-specific identification to the base station. The random number is generated in a given transponder with the aid of a random number generator, the relevant random number generator is switched into a counter operating mode after reception of a selection command transmitted by the base station, while a count state of the random number generator is decremented or incremented when the base station transmits the start of a time slot, the relevant transponder transmits a transponder-specific identification to the base station if the count state of its random number generator is equal to a predetermined value, and the relevant random number generator is then switched back into the operating mode for random number generation.

17 Claims, 2 Drawing Sheets

METHOD, TRANSPONDER, AND CIRCUIT FOR SELECTING ONE OR MORE TRANSPONDERS

This application is a continuation, under 35 U.S.C. §120, of U.S. patent application Ser. No. 11/210896, filed 25 Aug. 2005, which claims the benefit, under 35 U.S.C. §119(a), of German Patent Application No. DE 102004041437.8-31, filed 27 Aug. 2004.

BACKGROUND OF THE INVENTION

1. Field of the Invention

The present invention relates to a method for selecting one or more transponders, in particular backscatter-based transponders, from a plurality of transponders by a base station.

2. Description of the Background Art

Selection methods, which are also called anticollision methods, are typically used in, for example, contactless identification systems or radio frequency identification (RFID) systems. A system of this nature typically has a base station or a reader and a plurality of transponders or remote sensors, which are located in a response area of the base station at the same time. If the data transmission is to take place only between one transponder or a group of transponders and the base station, a selection process must be carried out prior to the data transmission in question.

In this context, a basic distinction is made between stochastic and deterministic selection methods. A detailed description of deterministic selection methods and also stochastic selection methods can be found, for example, in the textbook by Klaus Finkenzeller, RFID-Handbuch, $3^{rd}$ edition, HANSER, 2002, see especially Chapter 7.2, Vielfachzugriffsverfahren (multiple access methods), which has been published in English by John Wiley & Sons, and which is incorporated by reference herein.

In contrast to deterministic methods, stochastic methods do not presuppose a unique identification (U-ID) with a structure such as those described in the ISO 15963 standard. Assignment of such U-IDs is undertaken by bodies including a variety of manufacturer-independent organizations, for example the EAN/UCC or the IATA. However, the assignment can also be made by a manufacturer on its own. As a result, it is not always possible to ensure the uniqueness of U-IDs in open systems in which transponders from arbitrary manufacturers may be located in the response area of a base station. Stochastic methods permit selection even in these cases. Examples of such stochastic methods include the ALOHA method, the slotted ALOHA method, and the dynamic slotted ALOHA method.

The ALOHA method is a transponder-controlled, stochastic method in which the transponders transmit their data for transmission with a time offset. As a rule, the time offset is set on the basis of a random number generated in the transponder. If multiple transponders transmit an identification within the same time slot, a so-called collision occurs. This generally prevents the base station from being able to receive the transmitted data error-free.

In the slotted ALOHA method, the probability of collision is significantly reduced as compared to the plain ALOHA method. It is a base-station controlled, stochastic method in which the transponders are active, i.e. begin transmission of data, only at defined, synchronous points in time. To this end, the base station prescribes numbered time slots, or slots, and the transponders each generate a random number, with every transponder whose random number corresponds to the number of a time slot transmitting data or an identification to the base station in this time slot. To initiate the selection process, the base station generally transmits a command to the transponders, which indicates the start of a selection procedure. After receiving the command, the transponders store the applicable random numbers, which for example were previously generated or calculated in the transponder. When only one transponder transmits an identification within a time slot, this transponder is selected within the time slot, or can be selected by the base station by transmission of a command or an acknowledgement signal. The base station can then, for example, perform write and/or read operations on this transponder.

When multiple transponders transmit an identification within the same time slot, a collision occurs. Depending on the bit coding, the base station can detect such a collision immediately or after a delay, and can skip the corresponding time slot and attempt to process time slots in which no collision occurs, or can initiate a new selection procedure by sending an appropriate command to the transponders. Since the transponders typically generate or store new random numbers, the possibility exists that no collision will now occur.

The probability of collision depends on the number of transponders in the base station's response area and the number of time slots made available. Since the number of transponders can fluctuate tremendously, a static number of time slots can lead to problems. If the number of time slots is too small, the probability of collision increases sharply. If the number of time slots is too large, there are correspondingly many time slots in which no transponder transmits data. The time required for the selection process thus increases sharply in both cases. To achieve optimum throughput, the number of time slots in which the transponders transmit data should be selected to approximately equal the number of transponders.

The dynamic slotted ALOHA method, in which the number of available time slots can be controlled by the base station, was created in order to solve this problem. In this method, the base station can initiate a selection process with a small number of time slots, for example. If collisions frequently occur in this case, the base station can initiate a new selection process in which the number of time slots is increased, thus reducing the probability of collisions.

A variety of methods are known for producing a random number for the stochastic methods. Thus, for example, the time period between a reset of the transponder and the point in time when a first symbol is received can be used as a basis for calculating the random number. Other methods combine numbers from two different areas of memory in order to determine the random number, while as a further refinement, a received data item can additionally be included in the calculation.

Other methods use a linear feedback shift register for random number generation; the shift register can be operated with a clock source, which has a certain amount of dispersion between different transponders, for example. As a result of their individual clock sources, after a certain operating time, the shift registers of different transponders then exhibit different values which can be used as random numbers.

In the slotted ALOHA method, the base station defines numbered time slots and a transponder whose random number corresponds to the number of a time slot sends data or identification to the base station during this time slot.

For this purpose, a transponder customarily has what is known as a slot counter and a binary comparator in addition to the random number generator. After the initiation of the selection process by the base station, the slot counter is decremented or incremented, starting from an initial value, when the base station indicates the start of a new slot or time slot by transmitting a corresponding command. The binary comparator compares the random number present in the random number generator with the current slot number of the slot counter, and if the random number and slot number match, the relevant transponder transmits its identification to the base station. Since the random number generator and the slot counter are designed as separate units, such an implementation requires a relatively large chip area.

SUMMARY OF THE INVENTION

It is therefore an object of the present invention to provide a method and a device for a base station to select one or more transponders from a plurality of transponders that permits reliable and time-efficient selection and requires comparatively little chip area for implementation in a transponder.

In accordance with the invention, the random number can be generated in a given transponder with the aid of a random number generator. The random number generator is switched into a counter operating mode after reception of a selection command transmitted by the base station. In the counter operating mode, the random number generator operates as a normal counter or slot counter. The count state of the random number generator operating as a counter is decremented or incremented when the base station transmits the start of a time slot. If the count state of the random number generator is equal to a predetermined value, the relevant transponder transmits a transponder-specific identification to the base station. The relevant random number generator is then switched back into the operating mode for random number generation. As a result of the fact that the random number generator also serves as a slot counter during certain time intervals, it is possible to eliminate a separate slot counter used only for this purpose. This reduces the chip area needed. Due to the switchover of the random number generator to the operating mode for random number generation after the transmission of the transponder-specific identification, the generation of a new random number begins as early as possible. In the case of random number generation based on a dispersion of the clock source, this ensures optimal utilization of the random number space, since the differences in the clock sources of different transponders have a greater effect as a result of the longer time duration of random number generation. When another selection process is to be performed after the current selection process, for example because collisions have occurred in a slot, usable random numbers are thus available soon in the transponders in question, with the result that no waiting time is necessary between successive selection processes.

In a further embodiment, the random number can be generated with the aid of a linear feedback shift register. Such shift registers can easily be switched between the operating mode for generating the random number and the counter operating mode. Moreover, it is simple to generate random numbers with the aid of such components in combination with a dispersion or uncertainty of a clock source used to clock the shift register.

In yet a further embodiment, switchover into the operating mode for generating random numbers can depend on whether the base station transmits a command to the transponder following the transmission of the transponder-specific identification. For example, switchover into the operating mode for generating random numbers can be omitted if the base station sends an acknowledgement command to the transponder in question. The selection of the transponder is indicated by the acknowledgement command, i.e., it need not necessarily participate in a subsequent process. In this case, the immediate switchover into the operating mode for generating random numbers can be omitted, which reduces the power consumption of the transponder and thus increases its transmission range.

In another embodiment, an initial count state of the random number generator can be the generated random number, and the relevant transponder transmits its transponder-specific identification to the base station when the count state of its random number generator is zero. The random number generator merely switches to the counter operating mode here and then decrements or increments the count state. Consequently, no separate storage element for storing the random number is necessary, thus reducing the chip area needed. Detection that the count state has assumed the value ZERO is simpler to implement in circuit technology than a comparison with an arbitrary value. This in turn reduces the necessary chip area.

The generated random number can be stored, then the count state of the random number generator can be set to an initial value, in particular zero, and the transponder in question transmits its transponder-specific identification to the base station when the count state is equal to the stored value of the random number.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
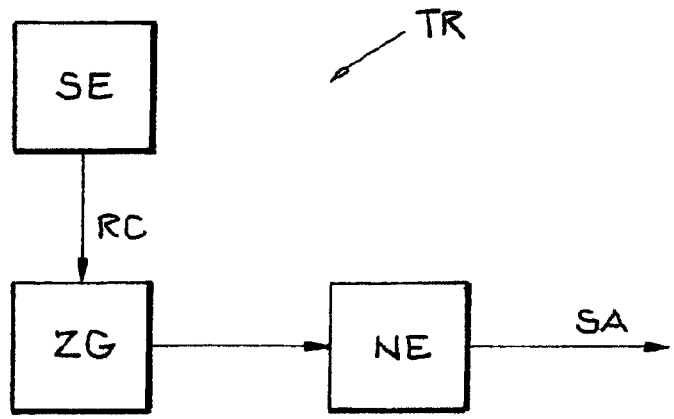
FIG. 1 is a block diagram of a transponder having a random number generator—that is operated in an operating mode for generating random numbers or in a counter operating mode—, a control logic unit, and a zero detection unit.

FIG. 1 shows a block diagram of a backscatter-based, passive transponder TR with a control logic unit SE, a random number generator ZG that operates either in an operating mode for generating random numbers or in a counter operating mode as a function of a signal RC provided by the control logic unit SE, and a zero detection unit NE that provides a signal SA, which signal enables the transmission of a transponder-specific identification to a base station.

In the operating mode for generating random numbers, the random number generator ZG is configured as a linear feedback shift register that is operated with a clock provided in the transponder TR. The clock provided in the transponder TR exhibits a certain dispersion between different transponders, by which means different values arise in the shift registers of the transponders in question after a certain operating period. In the counter operating mode, the random number generator ZG is configured as a conventional counter, for example as a ripple counter.

The zero detection unit NE is coupled to the random number generator ZG and monitors the count state of the random number generator ZG when the latter is in the counter operating mode. If the count state of the random number generator ZG is zero, the signal SA becomes active, thus activating the transmission of the transponder-specific identification to the base station.

Figure 2:
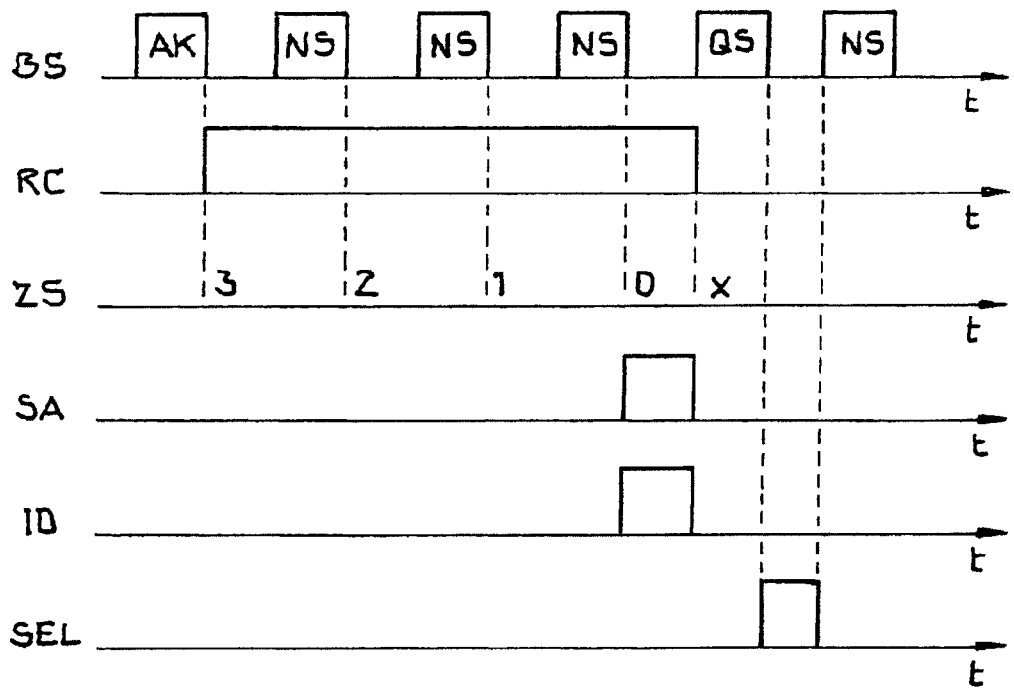
FIG. 2 is a timing diagram of control signals of the units from FIG. 1 during a selection process.

FIG. 2 shows a timing diagram of control signals of the units shown in FIG. 1 during a selection process by a base station BS. The selection method or selection process, in this example, is based on a slotted ALOHA selection method or on a dynamic slotted ALOHA selection method.

The base station initiates the selection process by transmitting a selection command AK. The transponder TR receives the selection command AK. The control logic unit SE then activates the signal RC by a level transition from low to high. As a result of the level transition of the signal RC, the random number generator ZG is switched over from the operating mode for generating random numbers to the counter operating mode by clocking of the linear feedback shift register. During the counter operating mode, a count state ZS of the random number generator is decremented when the base station transmits the start of a time slot. The initial count state ZS here is the random number contained in the shift register prior to the switchover into the counter operating mode. In the example embodiment shown, the initial count state ZS is 3.

The base station now transmits a command NS, which indicates the start of a time slot. In response, the count state ZS of the random number generator ZG is reduced by one, to 2. The zero detection unit NE checks whether the count state ZS is zero. Since this is not yet the case, the signal SA remains at a low level.

As a result, the base station BS now transmits two additional commands NS, with the count state ZS again being reduced by one in each case. After the last command NS, the count state ZS is zero. The zero detection unit NE detects this, and activates the signal SA by a level transition from low to high. In response, the transponder TR transmits a transponder-specific identification ID to the base station BS.

The base station BS receives the transponder-specific identification ID and sends an acknowledgement signal QS to the transponder TR. The transponder TR is now selected in the current time slot, which is indicated by a signal SEL. The base station BS can then, for example, perform write and/or read operations (not shown) on the transponder TR.

Following the transmission of the transponder-specific identification ID by the transponder TR, the control logic unit SE deactivates the signal RC through a level transition from high to low. As a result of the level transition of the signal RC, the random number generator ZG is again switched over to the operating mode for generating random numbers by clocking of the linear feedback shift register, with an initial value X being assigned to the shift register. This switchover could also be omitted in the case shown, since the base station BS transmits the acknowledgement signal QS.

Once the necessary operations with the transponder TR have been completed, the base station BS transmits an additional command NS, indicating a new time slot in which other transponders (not shown) can be selected. The transponder shown then withdraws from the current selection process.

Figure 3:
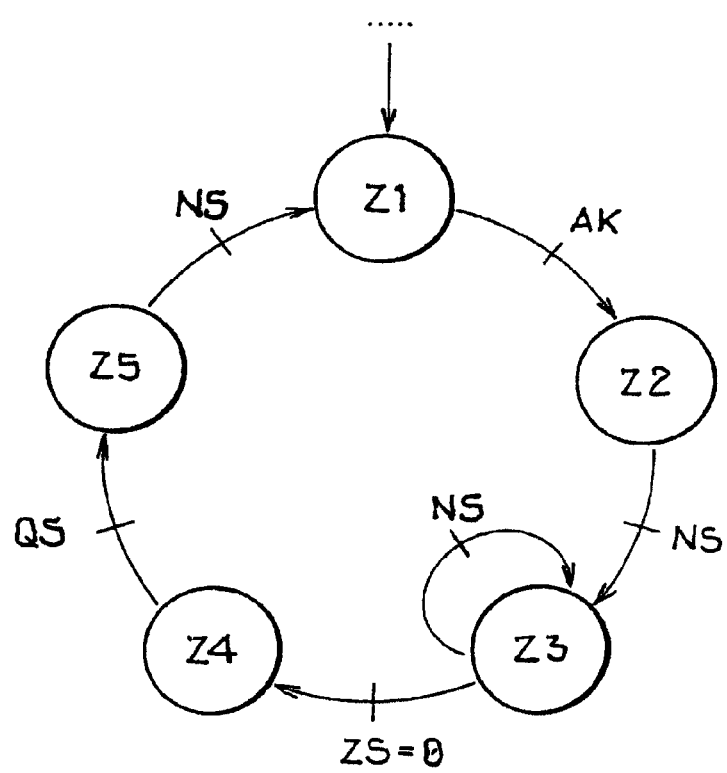
FIG. 3 is a state diagram of the transponder from FIG. 1 during the selection process shown in FIG. 2.

FIG. 3 shows a state diagram of the transponder from FIG. 1 during the selection process shown in FIG. 2. At the start of the selection process, prior to reception of the command AK, the transponder TR is in a base state Z1. In this state Z1, the random number generator ZG continuously generates random numbers.

When the transponder TR receives the command AK sent by the base station BS, it switches to a state Z2. In the state Z2, the random number generator ZG is switched over to the counter operating mode. The initial count state ZS now is the random number contained in the shift register prior to the switchover to the counter operating mode. The transponder now waits to receive a command NS.

When the transponder TR receives the command NS sent by the base station BS, it switches to a state Z3 and decrements the count state ZS. In the state Z3, the count state ZS is decremented by one each time a command NS is received from the base station.

When the count state ZS is zero, the transponder TR switches to a state Z4, in which it transmits its transponder-specific identification ID to the base station BS. The random number generator ZG is then again switched over into the operating mode for random number generation. The transponder now waits to receive the acknowledgement command QS from the base station BS.

When the transponder TR receives the acknowledgement command QS sent by the base station BS, it switches to a state Z5 during which it is selected. The base station BS can then, for example, perform write and/or read operations (not shown) on the transponder TR.

When the transponder TR receives another command NS sent by the base station BS, it switches back to the state Z1, which is to say it withdraws from the current selection process and waits for a new selection command AK.

Naturally, the diagrams shown are merely examples, and serve only to demonstrate the inventive selection process by way of example.

As an alternative to the example embodiment shown, the generated random number can be stored after the command AK is received, with the count state of the random number generator now functioning as a counter then being set to an initial value, in particular zero. As in the illustrated example embodiment, the count state is also incremented with each command NS. The transponder transmits its transponder-specific identification to the base station when the count state is equal to the stored value of the random number.

The embodiment shown reduces the number of components needed for a slotted selection process, making it possible to reduce the chip area required. In addition, the available random number space is better utilized as a result of the early switchover to renewed random number generation. This permits an additional selection process immediately thereafter, if such is necessary.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A method comprising:
generating at a transponder by random-number-generator circuitry a random number corresponding to a time slot, the random-number-generator circuitry being in an operating mode for generating random numbers, the random-number-generator circuitry being configured in the operating mode as a linear feedback shift register;
switching, in response to receiving a selection command from a base station and by clocking of the linear feedback shift register, the random-number-generator circuitry from the operating mode to a counter-operating mode, the random-number-generator circuitry configured in the counter operating mode as a counter, an initial value of a count state of the random-number-generator circuitry in the counter-operating mode being the random number contained in the linear feedback shift register immediately prior to switching the random-number-generator circuitry from the operating mode to the counter-operating mode;

modifying, when the random-number-generator circuitry is in the counter-operating mode and in response to receiving a signal corresponding to a start of the time slot from the base station, the count state of the random-number-generator circuitry from the initial value to a modified value;

comparing the modified value of the count state of the random-number-generator circuitry to a predetermined value to determine whether to transmit an identification corresponding to the transponder; and transmitting the identification corresponding to the transponder when the modified value of the count state is the predetermined value.

2. The method of claim 1, further comprising switching the random-number-generator circuitry from the counter-operating mode to the operating mode for generating random numbers in response to the count state being the predetermined value.

3. The method of claim 1, further comprising receiving an acknowledge command from the base station subsequent to the transmitting the identification.

4. The method of claim 3, further comprising allowing a write or read operation on the transponder in response to receiving the acknowledge command.

5. The method of claim 1, further comprising monitoring the count state after the signal corresponding to the start of the time slot.

6. The method of claim 1, wherein the random-number-generator circuitry is configured as a ripple counter in the counter-operating mode.

7. A transponder comprising:

random-number-generator circuitry having an operating mode for generating random numbers and a counter-operating mode, the random-number-generator circuitry configured to:

generate, when the random-number-generator circuitry is in the operating mode, a random number corresponding to a time slot, the random-number-generator circuitry configured in the operating mode as a linear feedback shift register; and modify, when the random-number-generator circuitry is in the counter-operating mode and in response to receiving from a base station a signal corresponding to a start of the time slot, a count state from an initial value to a modified value;

a control-logic unit configured to switch, in response to receiving a selection command from a base station and by clocking of the linear feedback shift register, the random-number-generator circuitry from the operating mode to the counter-operating mode, the random-number-generator circuitry configured in the counter operating mode as a counter, the initial value of the count state of the random-number-generator circuitry in the counter-operating mode being the random number contained in the linear feedback shift register immediately prior to switching the random-number-generator circuitry from the operating mode to the counter-operating mode; and a comparison unit configured to:

compare the modified value of the count state of the random-number-generator circuitry to a predetermined value to determine whether to transmit an identification corresponding to the transponder; and transmit the identification corresponding to the transponder when the modified value of the count state is the predetermined value.

8. The transponder of claim 7, wherein the control unit is further configured to switch the random-number-generator-circuitry from the counter-operating mode to the operating mode for generating random numbers in response to the count state being the predetermined value.

9. The transponder of claim 7, wherein the control unit is further configured to receive an acknowledge command from the base station subsequent to the transmitting the identification.

10. The transponder of claim 9, the control unit is further configured to allow a write or read operation on the transponder in response to receiving the acknowledge command.

11. The transponder of claim 7, wherein the comparison unit is further configured to monitor the count state after the signals corresponding to a start of the time slot.

12. The transponder of claim 7, wherein the random-number-generator circuitry is configured as a ripple counter in the counter-operating mode.

13. A circuit configured to:

generate at a transponder by random-number-generator circuitry a random number corresponding to a time slot, the random-number-generator circuitry being in an operating mode for generating random numbers, the random-number-generator circuitry configured in the operating mode as a linear feedback shift register;

switch, in response to receiving a selection command from a base station and by clocking of the linear feedback shift register, the random number generator circuitry from the operating mode to a counter-operating mode, the random-number-generator circuitry configured in the counter operating mode as a counter, an initial value of a count state of the random-number-generator circuitry in the counter-operating mode being the random number contained in the linear feedback shift register immediately prior to switching the random-number-generator circuitry from the operating mode to the counter-operating mode;

modify, when the random-number-generator circuitry is in the counter-operating mode and in response to receiving a signal corresponding to a start of the time slot from the base station, the count state of the random-number-generator circuitry from the initial value to a modified value;

compare the modified value of the count state of the random-number-generator circuitry to a predetermined value to determine whether to transmit an identification corresponding to the transponder; and transmit the identification corresponding to the transponder when the modified value of the count state is the predetermined value the initial value of the count state of the random-number-generator circuitry in the counter-operating mode is the random number contained in the linear feedback shift register immediately prior to switching the random-number-generator circuitry from the operating mode to the counter-operating mode.

14. The circuit of claim 13, wherein the circuit is further configured to switch the random-number-generator-circuitry from the counter-operating mode to the operating mode for generating random numbers in response to the count state being the predetermined value.

15. The circuit of claim 13, wherein the circuit is further configured to receive an acknowledge command from the base station subsequent to the transmitting the identification.

16. The circuit of claim 15, wherein the circuit is further configured to allow a write or read operation on the transponder in response to receiving the acknowledge command.

17. The circuit of claim 13, wherein the circuit is further configured to monitor the count state after the signal corresponding to a start of the time slot.

\* \* \* \* \*